United States Patent

Totani

[11] Patent Number: 5,807,222
[45] Date of Patent: Sep. 15, 1998

[54] BAG MAKING MACHINE

[75] Inventor: Mikio Totani, Muko, Japan

[73] Assignee: Totani Giken Kogyo Co., Ltd., Kyoto, Japan

[21] Appl. No.: 530,416

[22] Filed: Sep. 19, 1995

[30] Foreign Application Priority Data

Sep. 19, 1991 [JP] Japan .................................. 7-260748
Sep. 19, 1994 [JP] Japan .............................. 6-012772 U

[51] Int. Cl.$^6$ .............................. B31B 1/14; B31B 23/14
[52] U.S. Cl. ................................. 493/22; 493/10; 493/29;
493/34; 493/227; 83/35; 83/371; 83/365
[58] Field of Search .............................. 493/10, 11, 15,
493/22, 34, 193, 194, 199, 203, 227, 340,
361, 362, 363, 366, 13, 14, 30; 83/33, 371,
365

[56] References Cited

U.S. PATENT DOCUMENTS

| 4,205,769 | 6/1980 | Blitchington | 83/365 |
| 4,220,077 | 9/1980 | Miller . | |
| 4,549,453 | 10/1985 | Yazaki | 83/365 |
| 4,790,694 | 12/1988 | Wilent | 83/71 |
| 4,901,359 | 2/1990 | Bruder | 83/56 |
| 5,136,906 | 8/1992 | Antonissen | 83/42 |
| 5,212,656 | 5/1993 | Clary | 493/12 |
| 5,241,483 | 8/1993 | Porret | 83/371 |
| 5,251,141 | 10/1993 | Payr | 83/367 |
| 5,267,168 | 11/1993 | Antonissen | 83/75.5 |

FOREIGN PATENT DOCUMENTS

| 62-160231 | 7/1987 | Japan . |
| 3197124 | 8/1991 | Japan . |
| 3227228 | 10/1991 | Japan . |

Primary Examiner—John Sipos
Assistant Examiner—Christopher W. Day
Attorney, Agent, or Firm—Morgan & Finnegan, LLP

[57] ABSTRACT

According to the invention, there is provided a bag making machine including feeding means for feeding two or more superposed layers of plastic film longitudinally thereof and intermittently for a length, the layers of plastic film having void area means such as notch hole means, and a cutter for cutting the layers of plastic film crossly thereof along a line predetermined with respect to the void area means whenever feeding the layers of plastic film are temporarily stopped, to thereby successively make plastic bags. A detector is disposed near the cutter for recognizing the contour of the void area means as an image data immediately before or when the layers of plastic film are temporarily stopped. A computer is connected to the detector for calculating the difference between the position of the predetermined line of the layers and the position of the cutting edge means of the cutter in accordance with the image data of the detector. Drive means is connected to the computer for moving the cutter parallel to the layers feeding direction in response to the output signal from the computer to thereby compensate and eliminate the difference between the position of the predetermined line of the layers and the position of the cutting edge means of the cutter.

2 Claims, 9 Drawing Sheets

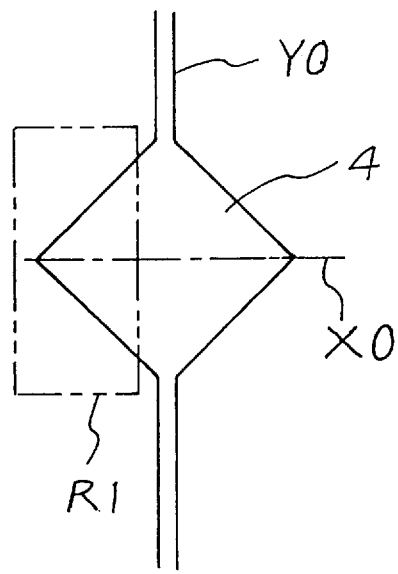
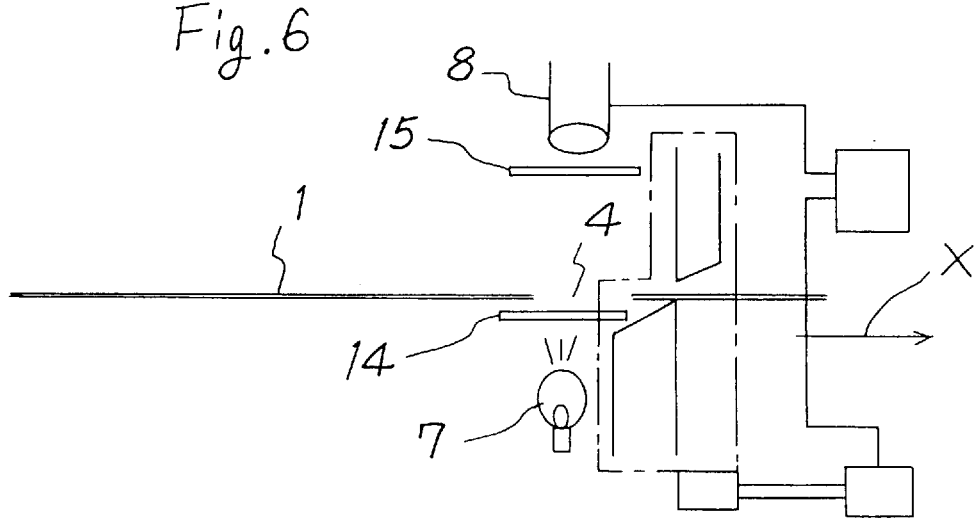

PRIOR ART

BAG MAKING MACHINE

FIELD OF THE INVENTION

The invention relates to a bag making machine for successively making plastic bags.

PRIOR ART

There has been generally used a bag making machine which includes feeding means such as feeding rollers rotated by a servo motor for feeding two or more superposed layers of plastic film 1 longitudinally thereof and intermittently for a length, as shown in FIG. 18. Longitudinal and cross sealers are operated to heat seal the layers of plastic film 1 longitudinally and crossly thereof whenever feeding of the layers of plastic film 1 are temporarily stopped so that longitudinal and cross sealed areas 2 and 3 are formed on the layers of plastic film 1. The longitudinal sealed areas 2 extend parallel to the feeding direction X of the layers of plastic film 1. The cross sealed areas 3 extend perpendicularly to the feeding direction X. Notch holes 4 may then be punched in the intersection between the longitudinal and cross sealed areas 2 and 3 of the layers whenever the layers of plastic film 1 are temporarily stopped. A slitter slits the layers of plastic film 1 along longitudinal lines Y0 extending through the centers of the notch holes 4. A cutter is operated to cut the layers of plastic film 1 crossly thereof along a cross line X0 extending through the centers of the notch holes 4 whenever the layers of plastic film 1 are temporarily stopped, to thereby successively make plastic bags. Each of the plastic bags has four bevelled or round corners formed by the notch holes 4.

In the bag making machine, it is required to cut the layers of plastic film 1 precisely along the cross line X0 extending through the centers of notch holes 4, otherwise protrusions 5 are formed at the corners of plastic bags, as shown in FIG. 19. In this connection, a cutting apparatus for precisely cutting is disclosed in Japanese Laid-Open Patent Publication No. 160231 of 1987, the applicant of which is Totani. In the apparatus in the publication, a light source and a detector are disposed near the cutter on the upper side of the layers feeding path. The light source directs a light toward the layers of plastic film around the notch hole when the layers of plastic film are temporarily stopped. The light passes through the notch hole, a portion of the light reflecting from the layers of plastic film around the notch hole. The detector includes a series of elements arranged along a line extending crossly of the layers of plastic film. The elements receive the light reflecting from the layers of plastic film to thereby measure the width of the notch hole on the line along which the elements are arranged. The apparatus compares the measured value of the width of the notch hole on the line with a reference value which corresponds to the width of the notch hole at the center thereof, to thereby calculate the difference between the position of the cross line extending through the centers of the notch holes and the position of the cutting edge of the cutter. Drive means moves the cutter parallel to the layers feeding direction to thereby compensate and eliminate the difference between the position of the cross line extending through the center of the notch holes and the position of the cutting edge of the cutter. The cutter then cuts the layers of plastic film crossly thereof. The layers of plastic film can therefore be cut precisely along the cross line extending through the centers of notch holes. The protrusions 5 are not formed at the corners of plastic bags.

However, the apparatus has a problem that the layers of plastic film 1 may spread out after slitting the layers along the longitudinal line Y0 to widen the notch hole 4. This affects the measured value of the width of the notch hole 4, resulting in miscalculation of the difference between the position of the cross line X0 extending through the center of the notch holes 4 and the position of the cutting edge of the cutter. A dust may be adhered to the periphery of the notch hole 4. This also affects the measured value. The notch holes 4 may be ragged by the malfunction of the punching means to affect the measured value. Accordingly, the apparatus can not always cut the layers of plastic film 1 precisely along the cross line X0 extending through the center of notch holes 4.

In addition, a cutting apparatus is disclosed in Japanese Laid-Open Patent Publication No. 197124 of 1991, the applicant of which is also Totani. In the apparatus in the application, it is intended to cut the layers of plastic films crossly thereof along two lines C1 and C2 extending on the opposite sides of the center of each notch hole 4, as shown in FIG. 20, so that the protrusions 5 are not formed at the corners of plastic bags. To this end, the cutter is operated two times to cut the layers of plastic film two times whenever the layers of plastic film are temporarily stopped. Further, the cutter is moved by a small distance in the opposite direction to the layers feeding direction after the first time and before the second time of the two cutting times so that the layers of plastic film are cut along two lines C1 and C2. On the other hand, the longitudinal and cross sealers are operated only one time to heat seal the layers of plastic film whenever the layers of plastic film are temporarily stopped.

However, in order to operate the sealers only one time and operate the cutter two times whenever the layers of plastic film are temporarily stopped, two difference drive means such as servo motors are required, one drive means operating the sealers, the other operating the cutter. It is impossible to use a drive means such as a servo motor common to the sealers and the cutter to operate the sealers and the cutter synchronously with each other, resulting in high cost.

SUMMARY OF THE INVENTION

It is an object of the invention to provide a novel and improved bag making machine, in which the above problems are overcome. The bag making machine includes feeding means for feeding two or more superposed layers of plastic film longitudinally thereof and intermittently for a length, the layers of plastic film having void area means such as notch hole means, and a cutter for cutting the layers of plastic film crossly thereof along a line predetermined with respect to the void area means whenever feeding the layers of plastic film are temporarily stopped, to thereby successively make plastic bags.

Another object of the invention is to compensate and eliminate the difference between the position of the predetermined line of the layers and the position of the cutting edge means of the cutter without miscalculation, to thereby cut the layers of plastic film precisely along the predetermined line thereof.

Another object of the invention is to cut the layers of plastic film crossly thereof along two lines extending on the opposite sides of the center of each notch hole means whenever the layers of plastic film are temporarily stopped, without high cost.

According to the invention, a detector is disposed near the cutter for recognizing the contour of the void area means as an image data immediately before or when the layers of plastic film are temporarily stopped. A computer is connected to the detector for calculating the difference between the position of the predetermined line of the layers and the position of the cutting edge means of the cutter in accordance with the image data of the detector. Drive means is connected to the computer for moving the cutter parallel to the layers feeding direction in response to the output signal from the computer to thereby compensate and eliminate the difference between the position of the predetermined line of the layers and the position of the cutting edge means of the cutter.

A light source may be disposed near the cutter on one side of the layers feeding path for directing a light toward the layers of plastic film. The detector may be opposed to the light source on the other side of the layers feeding path for receiving the light passing through the void area means, or the light penetrating through the layers of plastic film around the void area means, to recognize the contour of the void area means as an image data.

In a preferred embodiment, the light source is disposed near and upstream of the cutter on one side of the layers feeding path for directing a light toward the layers of plastic film and the cutter. The detector is opposed to the light source on the other side of the layers feeding path for receiving the light passing through the void area means, or the light penetrating through the layers of plastic film around the void area means, immediately before the layers of plastic film are temporarily stopped. The cutter intercepts a portion of the light passing through the void area means, or a portion of the light penetrating through the layers of plastic film around the void area means, so that the detector recognizes the contour of the void area means as an image data in a range at least between the predetermined line of the layers and a portion of the cutter immediately before the layers of plastic film are temporarily stopped. The computer is connected to the detector for calculating the distance between the position of the predetermined line of the layers and the position of the cutting edge means of the cutter at the image data recognizing point in accordance with the image data of the detector. In addition, the computer measures or computes the feed length of the layers of plastic film from the image data recognizing point to the layers temporary stopping point, and compares the distance at the image data recognizing point with the feed length from the image data recognizing point to the layers temporary stopping point, to thereby calculate the difference between the position of the predetermined line of the layers and the position of the cutting edge means of the cutter at the layers temporary stopping point.

In another embodiment, the detector receives the light passing through the void area means, or the light penetrating through the layers of plastic film around the void area means, to recognize the contour of the void area means as an image data in a range at least between the predetermined line of the layers and a reference portion of the layers which is positioned upstream of the predetermined line, immediately before the layers of plastic film are temporarily stopped, and receives the light passing through the void area means, or the light penetrating through the layers of plastic film around the void area means, to recognize the contour of the void area means as an image data in a range including the reference portion of the layers, when the layers of plastic film are temporarily stopped. The computer calculates the distance between the predetermined line of the layers and the reference portion of the layers in accordance with the image data of the detector immediately before the layers of plastic film are temporarily stopped, and further calculates the distance between the position of the reference portion of the layers and the position of the cutting edge means of the cutter in accordance with the image data of the detector when the layers of plastic film are temporarily stopped. In addition, the computer compares the distance between the predetermined line of the layers and the reference portion of the layers with the distance between the position of the reference portion of the layers and the position of the cutting edge means of the cutter, to thereby calculate the difference between the position of the predetermined line of the layers and the position of the cutting edge means of the cutter.

In another embodiment, the bag making machine includes longitudinal and cross sealers for heat sealing the layers of plastic film longitudinally and crossly thereof whenever feeding of the layers of plastic film are temporarily stopped, the layers of plastic film having notch hole means formed in the cross sealed area thereof. The cutter is intended to cut the layers of plastic film crossly thereof along two lines extending on the opposite sides of the center of each notch hole means whenever the layers of plastic film are temporarily stopped. The bag making machine comprises drive means for operating the sealers two times to heat seal the layers of plastic film two times whenever the layers of plastic film are temporarily stopped, and operating the cutter two times synchronously with the sealers to cut the layers of plastic film two times whenever the layers of plastic film are temporarily stopped. The bag making machine further comprises drive means for moving the cutter by a small distance in the opposite direction to the layers feeding direction after the first time and before the second time of the two cutting times.

The feeding means may feed the layers of plastic film by a small length after the first time and before the second time of the two cutting times, instead of moving the cutter.

In another embodiment, the cutter comprises two cutting edges spaced from each other at a distance corresponding to the distance between the two lines to cut the layers of plastic film along the two lines at a time.

BRIEF DESCRIPTION OF THE DRAWINGS

FIG. 3 is a schematic plan view showing another recognizing range of the detector in FIG. 1.

FIG. 6 is a side view of another embodiment of the invention.

DESCRIPTION OF THE PREFERRED EMBODIMENT

Figure 1:
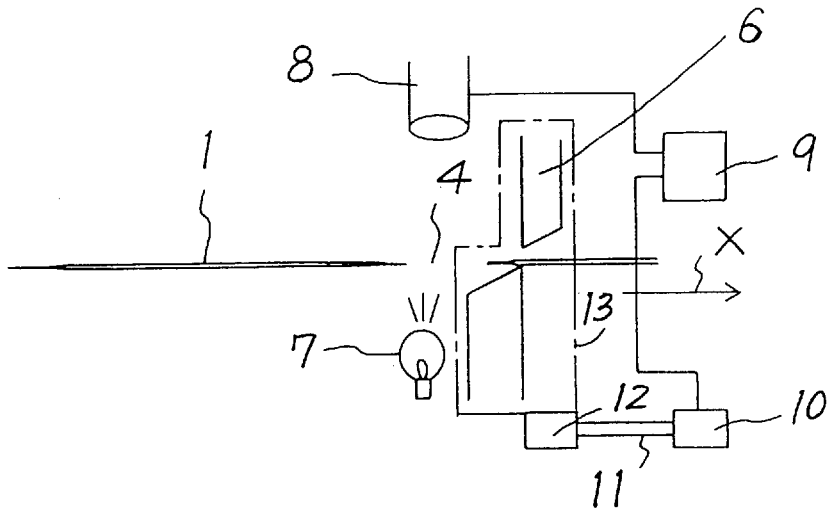
FIG. 1 is a side view of a preferred embodiment of the invention.

Referring to FIG. 1, there is shown a bag making machine which includes feeding means such as feed rollers rotated by a servo motor for feeding two superposed layers of plastic film 1 longitudinally thereof and intermittently for a length, as described above. The bag making machine further includes longitudinal and cross sealers operated by a servo motor to heat seal the layers of plastic film 1 longitudinally and crossly thereof whenever feeding of the layers of plastic film 1 are temporarily stopped so that longitudinal and cross sealed areas 2 and 3 are formed on the layers of plastic film 1. The longitudinal sealed areas 2 extend parallel to the feeding direction X of the layers of plastic film 1. The cross sealed areas 3 extend perpendicularly to the feeding direction X. Notch holes 4 are then punched in the intersection between the longitudinal and cross sealed areas 2 and 3 of the layers whenever the layers of plastic film 1 are temporarily stopped. A slitter slits the layers of plastic film 1 along longitudinal lines Y0 extending through the centers of the notch holes 4. In the embodiment, the notch hole 4 is rectangular having an upstream end A, two central ends B and a downstream end C, the slitting line Y0 extending through the upstream and downstream ends A and C of the notch hole 4, shown in FIG. 2.

Accordingly, the layers of plastic film 1 have void area means comprising the notch holes 4. The bag making machine further includes a cutter 6 operated by the servo motor common to the sealers and the cutter 6 to cut the layers of plastic film 1 crossly thereof along a line predetermined with respect to the void area means whenever the layers of plastic film 1 are temporarily stopped, to thereby successively make plastic bags. In the embodiment, the predetermined line comprises a cross line X0 extending through the centers or central ends B of the notch holes 4. Each of the plastic bags has four bevelled or round corners formed by the notch holes 4.

A light source 7 is disposed near and upstream of the cutter 6 on one side of the layers feeding path. A detector 8 is opposed to the light source 7 on the other side of the layers feeding path. In the embodiment, the layers of plastic film 1 are fed along a path extending horizontally, the light source 7 being positioned on the lower side of the layers feeding path, the detector 8 being positioned on the upper side of the layers feeding path. The detector 8 comprises a video camera including an electronic shutter.

Figure 2:
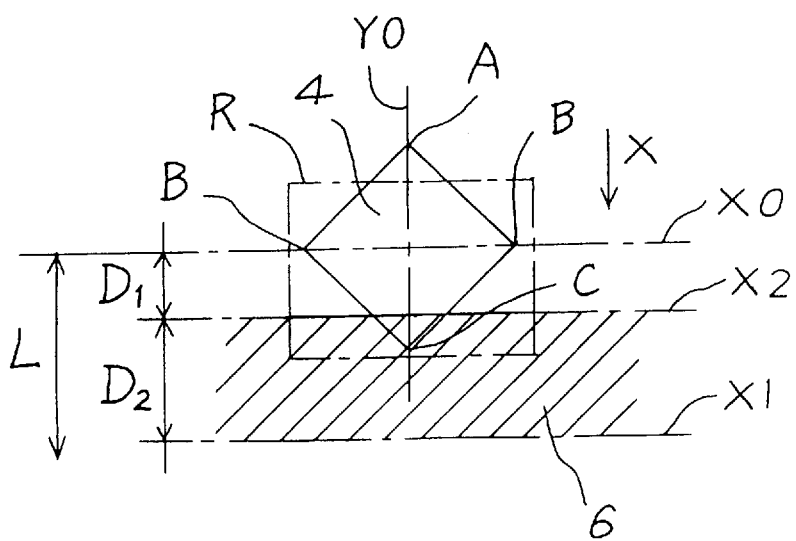
FIG. 2 is a schematic plan view showing the recognizing range of the detector in FIG. 1.

The light source 7 is intended to direct a light toward the layers of plastic film 1 and the cutter 6 when the layers of plastic film 1 are fed at a low speed and the notch hole 4 reaches the position of the light source 7, as shown in FIG. 1, immediately before the layers of plastic film 1 are temporarily stopped. The detector 8 is adapted to receive the light passing through the notch hole 4, the cutter 6 intercepting a portion of the light passing through the notch hole 4. The electronic shutter is clicked instantaneously so that the detector 8 recognizes the contour of the notch hole 4 as an image data in a range R at least between the predetermined line X0 of the layers and a portion of the cutter 6, as shown in FIG. 2, immediately before the layers of plastic film 1 are temporarily stopped. The layers of plastic film 1 are further fed a length L (about 8 mm) and then temporarily stopped by the feeding rollers driven by the servo motor.

The bag making machine further includes a computer 9 connected to the detector 8. The computer 9 calculates the distance D1 between the position of the predetermined line X0 of the layers and the position of the side X2 of the cutter 6 at the image data recognizing point in accordance with the image data of the detector 8. The computer 9 add that distance D1 to the distance D2 between the position of the side X2 of the cutter 6 and the position of the cutting edge X1 thereof, the distance D2 being previously recognized by the computer 9, to thereby calculate the distance D1+D2 between the position of the predetermined line X0 of the layers and the position of the cutting edge X1 of the cutter 6 at the image data recognizing point.

In addition, the computer 9 measures or computes the feed length L of the layers of plastic film 1 from the image data recognizing point to the layers temporary stopping point. In the embodiment, the computer 9 counts the number of pulses which are sent from the servo motor driving the feeding rollers to the computer 9 after the image data recognizing point, to measure the feed length L. The computer 9 then compares the distance D1+D2 at the image data recognizing unit with the feed length L from the image data recognizing point to the layers temporary stopping point, to thereby calculate the difference L−(D1+D2) between the position of the predetermined line X0 of the layers and the position of the cutting edge X1 of the cutter 6 at the layers temporary stopping point.

The bag making machine further includes drive means connected to the computer 9 for moving the cutter 6 parallel to the layers feeding direction X. The drive means comprises a servo motor 10 connected to the computer 9, a feeding screw 11 extending parallel to the layers feeding direction X and operatively connected to the servo motor 10, and a nut member 12 threadedly engaged with the feeding screw 11 and mounted on a frame 13, the cutter 6 being supported on the frame 13. The servo motor 10 rotates the feeding screw 11 in responsive to the output signal from the computer 9, after calculating the difference L−(D1+D2). The feeding screw 11 and the nut member 12 therefore move the cutter 6 and frame 13 parallel to the layers feeding direction X in response to the output signal from the computer 9, to thereby compensate and eliminate the difference L−(D1+D2) between the position of the predetermined line X0 of the layers and the position of the cutting edge X1 of the cutter 6 at the layers temporarily stopping point.

Figure 19:
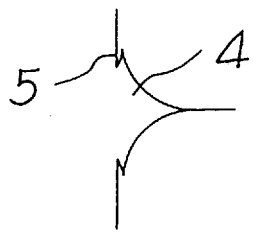
FIG. 19 is a schematic plan view showing protrusions formed at the corners of plastic bags.

The cutter 6 is then operated by the servo motor common to the sealers and the cutter 6 to cut the layers of plastic film 1 crossly thereof. The layers of plastic film 1 can therefore be cut precisely along the cross line X0 extending through the centers of the notch holes 4. The protrusions 5 shown in FIG. 19 are not formed at the corners of plastic bags.

Accordingly, in the bag making machine, it is not required to measure the width of the notch hole 4 but recognize the contour of the notch hole 4 as an image data, unlike the apparatus disclosed in Japanese Laid-Open Patent Publication No. 160231 of 1987. Accordingly, it does not result in miscalculation.

Figure 4:
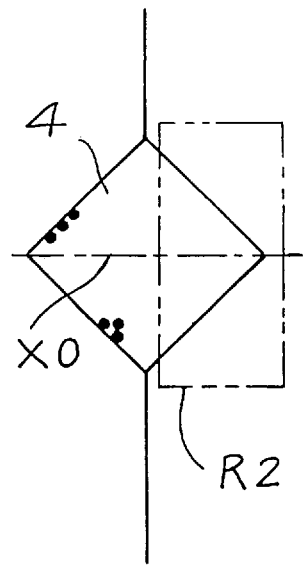
FIG. 4 is a schematic plan view showing another recognizing range of the detector in FIG. 1.
Figure 5:
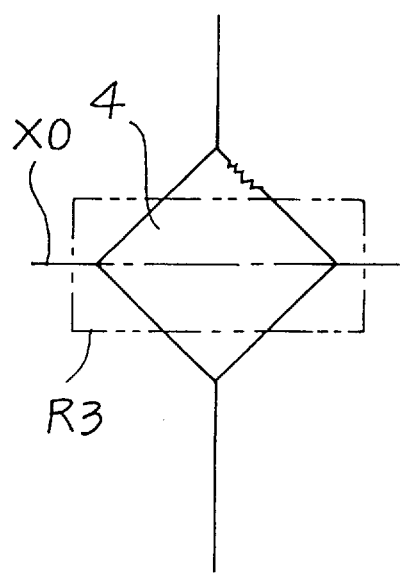
FIG. 5 is a schematic plan view showing another recognizing range of the detector in FIG. 1.

For example, the layers of plastic film may spread out after slitting along the longitudinal line Y0 to widen the notch hole 4, as shown in FIG. 3. In this case, the computer 9 compares the image data of the detector 8 with the previous image data to judge the unusualness in the image data so that the detector 8 recognizes only a usual image data in a range R1 and cancels the other image data. The computer 9 then calculates the difference between he position of the predetermined line X0 of the layers and the position of the cutting edge X1 of the cutter 6 in accordance with the image data in the range R1. If the dust is adhered to the periphery of the notch hole 4, the detector 8 recognizes only a usual image data in a range R2 and cancels the other image data, as shown in FIG. 4. If the notch hole 4 is ragged the detector 8 recognizes only a usual image data in a range R3 and cancels the other image data, as shown in FIG. 5. Accordingly, the bag making machine can compensate and eliminate the difference between the position of the predetermined line X0 of the layers and the position of the cutting edge X1 of the cutter 6 without miscalculation, to thereby cut the layers of plastic film 1 precisely along the predetermined line thereof.

Referring to FIG. 6, there is shown a bag making machine for feeding transparent layers of plastic film 1. The bag making machine includes two polarizing screens 14 and 15 disposed the opposite sides of the layers feeding path. The light source 7 is covered by the polarizing screen 14. The detector 8 is covered by the polarizing screen 15. The light source 7 therefore directs a light to the polarizing screen 14, the light penetrating through the polarizing screen 14 by which the light is polarized. The light then passes through the notch hole 4 and penetrates through the layers of plastic film 1 around the notch hole 4 to reach the polarizing screen 15 by which the light is again polarized. The polarizing screens 14 and 15 have orientations perpendicular to each other. Accordingly, as to the light passing through the notch hole 4, it does not penetrate through the polarizing screen 15. On the other hand, as to the light penetrating through the layers of plastic film 1, the layers of plastic film 1 rotate the wave front of the light polarized by the polarizing screen 14 so that the light can penetrate through the polarizing screen 15. The detector 8 therefore receives not the light passing through the notch hole 4 but the light penetrating through the layers of plastic film 1 around the notch hole 4, to recognize the contour of the notch hole 4 as an image data. Accordingly, even if the transparent layers of plastic film 1, the computer 9 can calculate the difference L−(D1+D2) between the position of the predetermined line X0 of the layers and the position of the cutting edge X1 of the cutter 6, as described above.

Figure 7:
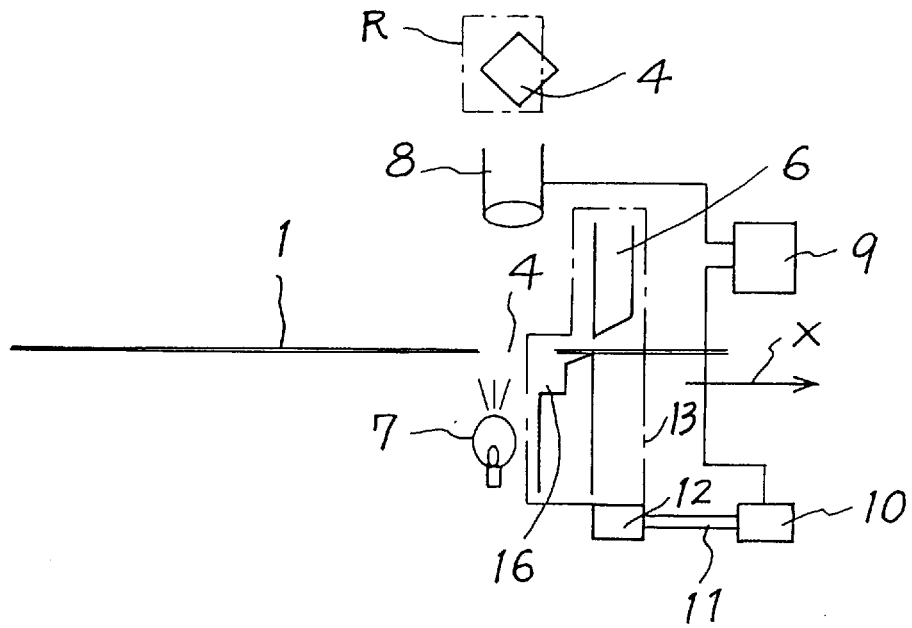
FIG. 7 is a side view of another embodiment of the invention.
Figure 9:
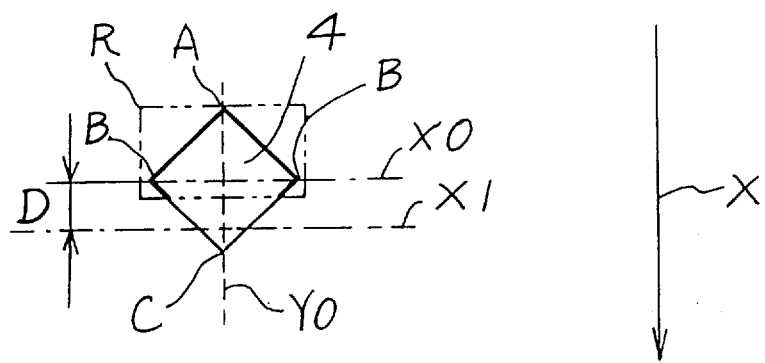
FIG. 9 is a schematic plan view showing the recognizing range of the detector in FIG. 7.

In a bag making machine shown in FIG. 7, the light source 7 directs a light toward the layers of plastic film 1 so that the detector 8 receives the light passing through the notch hole 4, or the light penetrating through the layers of plastic film 1 around the notch hole 4, immediately before the layers of plastic film 1 are temporarily stopped. The detector 8 recognizes the contour of the notch hole 4 as an image data in a range R at least between the predetermined line X0 of the layers and a reference portion of the layers, the reference portion comprising the upstream end A of the notch hole 4, which is positioned upstream of the predetermined line X0, as shown in FIG. 9. The computer 9 calculates the distance between the predetermined line X0 of the layers and the upstream end A of the notch hole 4 in accordance with the image data of the detector 8 immediately before the layers of plastic film 1 are temporarily stopped.

Figure 8:
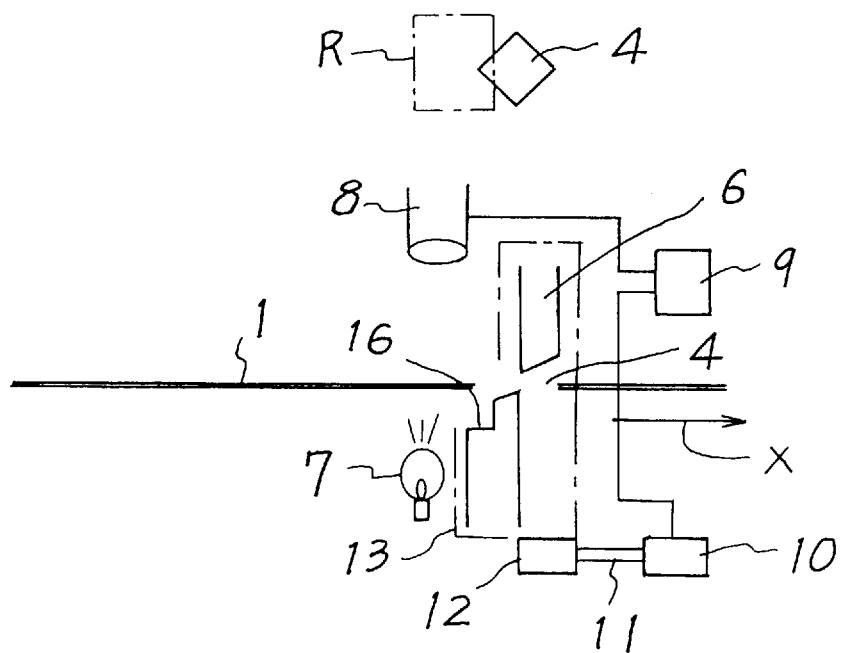
FIG. 8 is a side view showing the position of the notch hole when the layers of plastic film are temporarily stopped in FIG. 7.
Figure 10:
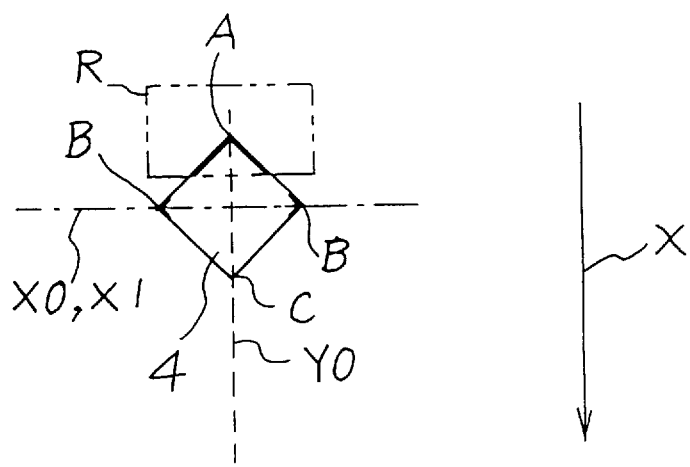
FIG. 10 is a schematic plan view showing the recognizing range of the detector in FIG. 8.

The light source 7 then again directs a light toward the layers of plastic film 1 so that the detector 8 receives the light passing through the notch hole 4, or the light penetrating through the layers of plastic film 1 around the notch hole 4, when the layers of plastic film 1 are temporarily stopped, as shown in FIG. 8. The detector 8 recognizes the contour of the notch hole 4 as an image data in a range R including the reference portion of the layers, that is the upstream end A of the notch hole 4, as shown in FIG. 10. The computer 9 calculates the distance between the position of the upstream end A of the notch hole 4 and the position of the cutting edge X1 of the cutter 6 in accordance with the image data of the detector 8 when the layers of plastic film 1 are temporarily stopped.

The computer 9 then compares the distance between the predetermined line X0 of the layers and the upstream end A of the notch hole 4 with the distance between the position of the upstream end A of the notch hole 4 and the position of the cutting edge X1 of the cutter 6, to thereby calculate the difference between the position of the predetermined line X0 of the layers and the position of the cutting edge X1 of the cutter 6. The servo motor 10 rotates the feeding screw 11 and moves the cutter 6 and the frame 13 parallel to the layers feeding direction X in response to the output signal from the computer 9, to thereby compensate and eliminate the difference between the position of the predetermined line X0 of the layers and the position of the cutting edge X1 of the cutter 6. Accordingly, the layers of plastic film 1 can be cut precisely along the cross line X0 extending through the centers of the notch holes 4.

Figure 11:
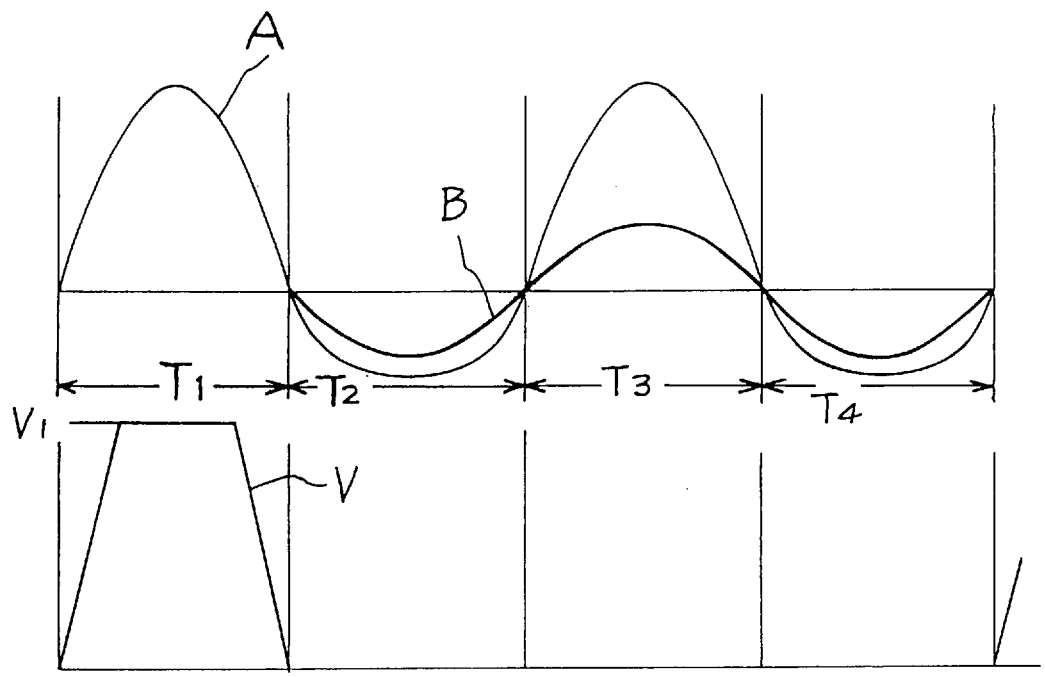
FIG. 11 is a graph of characteristic curve in another embodiment of the invention.
Figure 20:
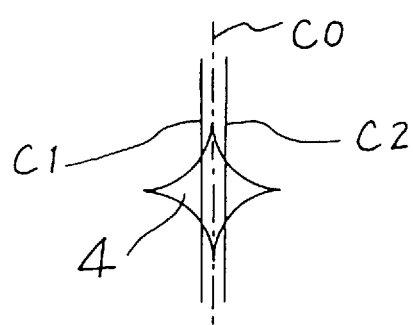
FIG. 20 is a schematic plan view showing two lines along which the layers of plastic film are cut.

Referring to FIG. 11, there is shown a bag making machine intended to cut the layers of plastic film crossly thereof along two lines C1 and C2 extending the opposite sides of the center of notch holes 4, as shown in FIG. 20, so that the protrusions 5 are not formed at the corners of the plastic bags. The bag making machine includes feeding means for feeding the layers of plastic film at a speed V for a time T1. The speed V is increased to and maintained at V1.

The bag making machine further includes drive means such as a servo motor common to the sealers and the cutter. The drive means operates the sealers two times to heat seal the layers of plastic film two times whenever the layers of plastic film are temporarily stopped, and operates the cutter two times synchronously with the sealers to cut the layers of plastic film two times whenever the layers of plastic film are temporarily stopped. In the embodiment, the drive means moves the sealers upwardly and downwardly along a curve A to heat seal the layers of plastic film for a time T2 and again heat seal the same for a time T4 after a time T3, whenever the layers of plastic film are temporarily stopped. In addition, the drive means moves the cutter upwardly and downwardly along a curve B synchronously with the sealers to cut the layers of plastic film in the time T2 and again cut the same in the time T4.

The bag making machine further includes drive means for moving the cutter by a small distance in the opposite direction to the layers feeding direction after the first time and before the second time of the two cutting times. Accordingly, the layers of plastic film can be cut along two lines C1 and C2. As to the sealers and the cutter, the drive means such as a servo motor may be common to both of them, the cost being not high.

Figure 12:
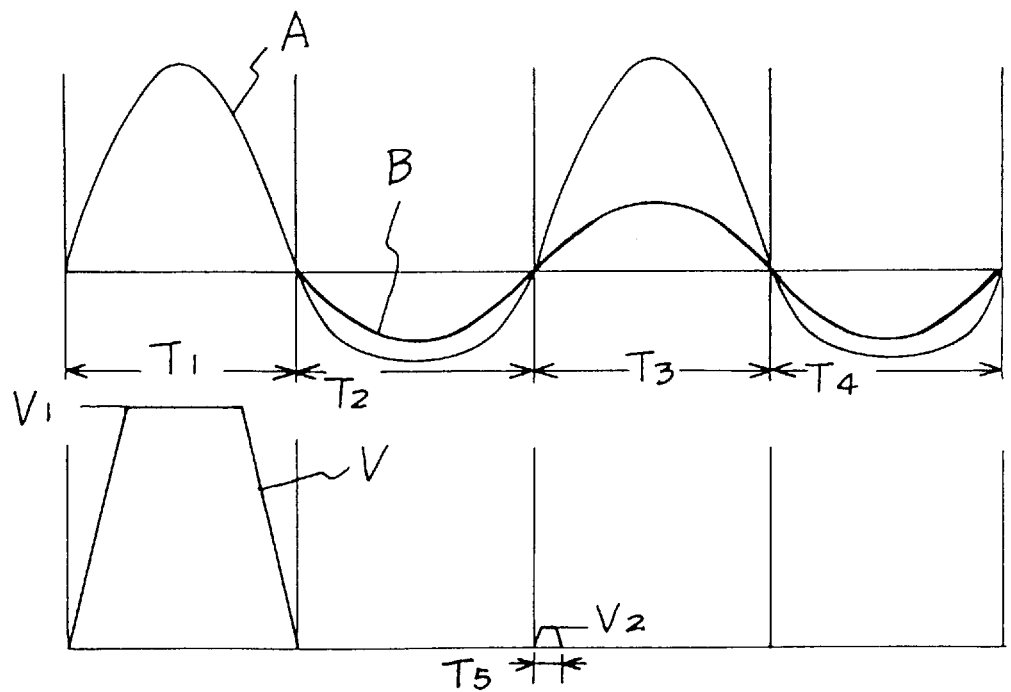
FIG. 12 is a graph of characteristic curve in another embodiment of the invention.

In the embodiment shown in FIG. 12, the feeding means is driven for a time T5 to feed the layers of plastic film by a small length after the first time and before the second time of the two cutting times, instead of moving the cutter. The speed thereof is merely increased to V2. This can also cut the layers of plastic film along two lines C1 and C2.

Figure 13:
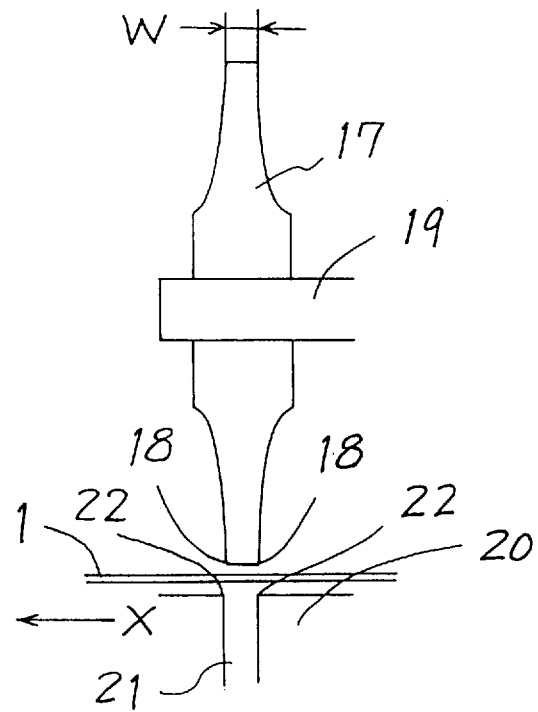
FIG. 13 is a side view of another embodiment of the invention.

Referring to FIG. 13, there is shown a bag making machine including a cutter 17 which is a rotary type comprising a disc. The cutter 17 has a width W and includes two cutting edges 18 formed circumferentially thereof. The cutting edges 18 are spaced from each other at a distance corresponding to the distance between two lines C1 and C2. The cutter 17 is mounted on a shaft 19 for rotation and opposed to a member 20. The layers of plastic film 1 are fed between the cutter 17 and the member 20, the shaft 19 extending parallel to the layers feeding direction X. The member 20 includes a groove 21 which has a width corresponding to the width W of the cutter 17 and extends perpendicularly to the layers feeding direction X, two complemental edges 22 being formed by the groove 21.

Figure 14:
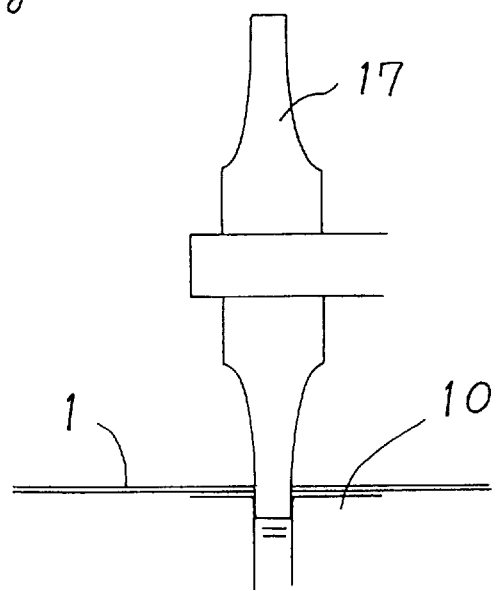
FIG. 14 is a side view showing the layers of plastic film cut by the cutter in FIG. 13.

The bag making machine further includes drive means for lowering the cutter 17 toward the member 20 so that the cutter 17 is received in the groove 21, as shown in FIG. 14, whenever feeding the layers of plastic film 1 are temporarily stopped. The drive means then moves the cutter 17 perpendicularly to the layers feeding direction X along the groove 21 so that the cutting edges 18 cooperate with the complemental edges 22 to cut the layers of plastic film 1 along two lines C1 and C2 at a time. It is therefore not required to operate the cutter two times whenever the layers of plastic film 1 are temporarily stopped, the cost being not high.

Figure 15:
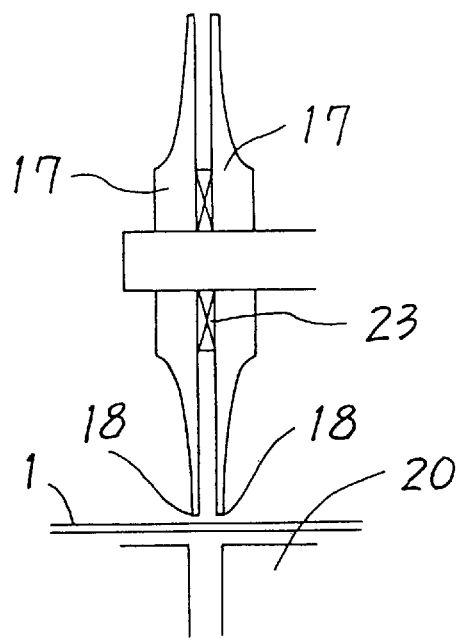
FIG. 15 is a side view of another embodiment of the invention.
Figure 16:
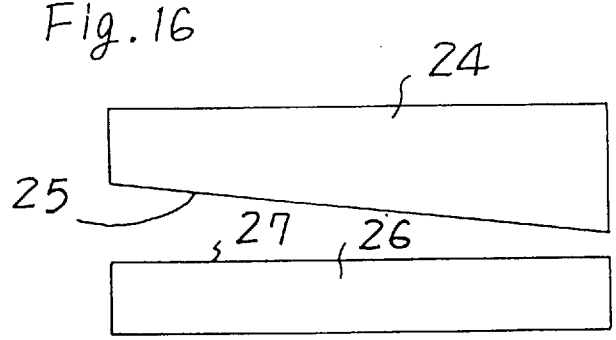
FIG. 16 is a schematic elevational view showing the cutter of another embodiment of the invention.
Figure 17:
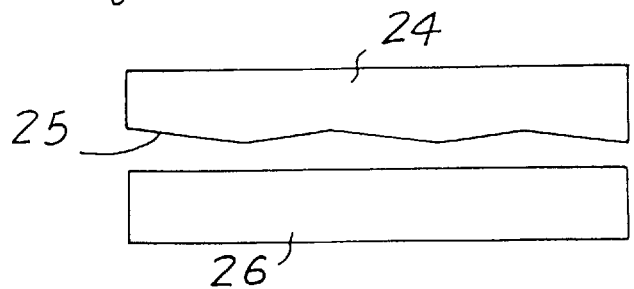
FIG. 17 is a schematic elevational view showing the cutter of another embodiment of the invention.
Figure 18:
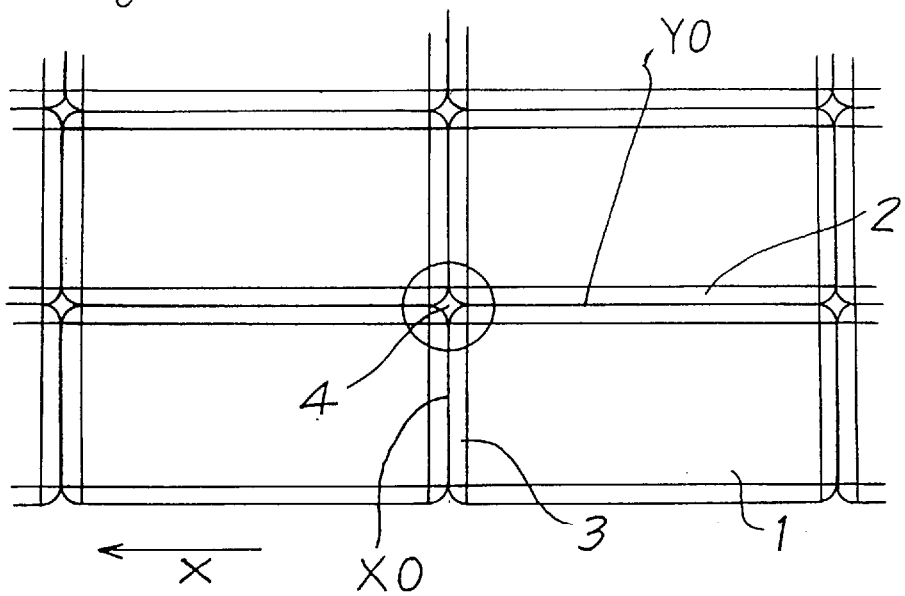
FIG. 18 is a schematic plan view showing notch holes formed in the intersection between the longitudinal and cross sealed areas of the layers of plastic film.

The cutter 17 may be a rotary type comprising two discs between which a spacer or spring 23 is interposed, as shown in FIG. 15. The cutter may comprise an upper blade 24 extending perpendicularly to the layers feeding direction X and including two cutting edges 25 spaced from each other at a distance corresponding to the distance between two lines C1 and C2. A lower blade 26 extends perpendicularly to the layers feeding direction X and includes two complemental edges 27 so that the cutting edges 25 cooperate with the complemental edges 27 to cut the layers of plastic film 1 along two lines C1 and C2 at a time, when the drive means lowers the upper blade 24. The cutting edges 25 may be serrated, as shown in FIG. 17.

What is claimed is:

1. A bag making machine for making plastic bags from a web material comprising two or more layers of plastic film, said bag making machine including feeding means for feeding said material intermittently for a length along a longitudinal material feeding path, said material having notch means such as notch holes formed therein, and a cutter including cutting edge means for cutting said material along a predetermined line which extends in a direction transverse to the longitudinal material feeding direction and intersects said notch means whenever feeding of said material is temporarily stopped, to thereby successively make plastic bags, said bag making machine comprising:

a light source disposed near and upstream of said cutter on a first side of said material feeding path for directing a light toward said material and said cutter, said light indicating a contour of said notch means when said light passes through said notch means;

a detector opposed to said light source on the a second side opposite from said first side of said material feeding path for receiving the light passing through said notch means at a first point immediately before said material is temporarily stopped, said cutting edge means being positioned to intercept a portion of the light passing though said notch means at said first point, said detector detecting a first position of said predetermined line of said material and a second position of said cutting edge means of said cutter in said material feeding direction at said first point, said detector recognizing said light passing through said notch means as an image data corresponding to the contour of said notch means;

said material being then temporarily stopped at a second point after said feeding means further feeds said material by a remaining length segment fed from said first point to said second point;

a computer connected to said detector having means for calculating a distance between the first position of said predetermined line of said material and the second position of said cutting edge means of said cutter in said material feeding direction at said first point in accordance with detected data received from said detector, means for measuring or computing said remaining length segment and comparing said distance with said remaining length segment to thereby calculate a difference between a third position of the predetermined line of said material and a fourth position of said cutting edge means of said cutter in said material feeding direction at said second point, and means for subsequently generating an output signal relating to said difference; and cutter drive means connected to said computer for moving a position of said cutter parallel to said material feeding direction in response to the output signal from said computer, to thereby adjust the position of said cutting edge means of said cutter in said material feeding direction and compensate for and eliminate said difference so that said material may be cut precisely along said predetermined line to form respective plastic bags without protrusions.

2. A bag making machine for making plastic bags from a web material comprising two or more layers of plastic film, said bag making machine including feeding means for feeding said material intermittently for a length along a longitudinal material feeding path, said material having notch means such as notch holes formed therein, and a cutter including cutting edge means for cutting said material along a predetermined line which extends in a direction transverse to the longitudinal material feeding direction and intersects said notch means whenever feeding of said material is temporarily stopped, to thereby successively make plastic bags, said bag making machine comprising:

a light source disposed near and upstream of said cutter (6) on a first side of said material feeding path for directing a light toward said material, said light indicating a contour of said notch means when said light passes through said notch means;

a detector opposed to said light source on the a second side opposite from said first side of said material feeding path for receiving the light passing through said notch means at a first point immediately before said material is temporarily stopped, to detect a first position of said predetermined line of said material and a second position of a reference portion of the material which is positioned upstream of said predetermined line in said material feeding direction at said first point, said detector recognizing said light passing through said notch means as an image data corresponding to the contour of said notch means;

said material being then temporarily stopped at a second point after said feeding means further feeds said material by a remaining length segment fed from said first point to said second point, to detect a third position of said reference point of the material in said material feeding direction and a fourth position of said cutting edge means of said cutter at said second point in accordance with the contour of said notch means indicated by the light passing through said notch means;

a computer connected to said detector having means for calculating a first distance between the first position of said predetermined line of said material and the second position of said reference portion of said material in said material feeding direction at said first point in accordance with detected data received from said detector, means for calculating a second distance between the third position of said reference portion of said material and the fourth position of the cutting edge means of said cutter in said material feeding direction at said second point in accordance with the detected data received from said detector, means for comparing said first distance between the first position of said predetermined line of said material and the second position of said reference portion of said material at said first point with said second distance between the third position of said reference portion of said material and the fourth position of the cutting edge means of said cutter in said material feeding direction at said second point, and means for subsequently generating an output signal relating to said difference; and cutter drive means connected to said computer for moving a position of said cutter parallel to said material feeding direction in response to the output signal from said computer, to thereby adjust the position of said cutting edge means of said cutter in said material feeding direction and compensate for and eliminate said difference so that said material may be cut precisely along said predetermined line to form respective plastic bags without protrusions.

* * * * *